(12) United States Patent
Wang et al.

(10) Patent No.: US 7,467,779 B2
(45) Date of Patent: Dec. 23, 2008

(54) MICROFLUIDIC MODULATING VALVE

(75) Inventors: Tzu-Yu Wang, Maple Grove, MN (US);
Eugen Cabuz, Eden Prairie, MN (US)

(73) Assignee: Honeywell International Inc.,
Morristown, NJ (US)

( * ) Notice: Subject to any disclaimer, the term of this patent is extended or adjusted under 35 U.S.C. 154(b) by 0 days.

(21) Appl. No.: 11/955,808

(22) Filed: Dec. 13, 2007

(65) Prior Publication Data

US 2008/0087855 A1 Apr. 17, 2008

Related U.S. Application Data

(63) Continuation of application No. 11/030,508, filed on Jan. 6, 2005, now Pat. No. 7,328,882.

(51) Int. Cl.
*F16K 31/02* (2006.01)

(52) U.S. Cl. .................. 251/129.01; 251/290; 251/331

(58) Field of Classification Search ............ 251/129.01, 251/129.06, 129.08, 290, 331
See application file for complete search history.

(56) References Cited

U.S. PATENT DOCUMENTS

| | | | |
|---|---|---|---|
| 2,403,692 A | 7/1946 | Tibbetts |
| 2,975,307 A | 3/1961 | Shroeder et al. |
| 3,304,446 A | 2/1967 | Martinek et al. |
| 3,381,623 A | 5/1968 | Elliot |
| 3,414,010 A | 12/1968 | Sparrow |
| 3,641,373 A | 2/1972 | Elkuch |
| 3,769,531 A | 10/1973 | Elkuch |
| 3,803,424 A | 4/1974 | Smiley et al. |
| 3,947,644 A | 3/1976 | Uchikawa |
| 3,993,939 A | 11/1976 | Slavin |
| 4,115,036 A | 9/1978 | Paterson |
| 4,140,936 A | 2/1979 | Bullock |
| 4,197,737 A | 4/1980 | Pittman |
| 4,360,955 A | 11/1982 | Block |
| 4,418,886 A | 12/1983 | Holzer |

(Continued)

FOREIGN PATENT DOCUMENTS

DE  19617852  1/1993

(Continued)

OTHER PUBLICATIONS

Athavale et al., "Coupled Electrostatics-Structures-Fluidic Simulations of A Bead Mesopump," Proceedings of the International Mechanical Engineers Congress & Exhibition, Nashville, Tennessee, Oct. 1999.

(Continued)

*Primary Examiner*—John Bastianelli
(74) *Attorney, Agent, or Firm*—Kris T. Fredrick

(57) ABSTRACT

A valve is provided that can selectively change the size of a flow channel in a valve in order to modulate the fluid flow through the valve. In one illustrative embodiment, the valve includes a housing that defines a cavity, with an inlet and an outlet extending into the cavity. A diaphragm is positioned in the cavity, where at least part of the diaphragm defines at least part of the fluid path. One or more electrodes are fixed relative to the diaphragm, and one or more electrodes are fixed relative to the housing such that the diaphragm can be electrostatically actuated to modulate the fluid flow through the valve.

20 Claims, 6 Drawing Sheets

U.S. PATENT DOCUMENTS

| | | | |
|---|---|---|---|
| 4,453,169 A | 6/1984 | Martner | |
| 4,478,076 A | 10/1984 | Bohrer | |
| 4,478,077 A | 10/1984 | Bohrer | |
| 4,498,850 A | 2/1985 | Perlov et al. | |
| 4,501,144 A | 2/1985 | Higashi et al. | |
| 4,539,575 A | 9/1985 | Nilsson | |
| 4,576,050 A | 3/1986 | Lambert | |
| 4,581,624 A | 4/1986 | O'Connor | |
| 4,585,209 A | 4/1986 | Aine et al. | |
| 4,619,438 A | 10/1986 | Coffee | |
| 4,651,564 A | 3/1987 | Johnson et al. | |
| 4,654,546 A | 3/1987 | Kirjavainen | |
| 4,722,360 A | 2/1988 | Odajima et al. | |
| 4,756,508 A | 7/1988 | Giachino et al. | |
| 4,821,999 A | 4/1989 | Ohtaka | |
| 4,826,131 A | 5/1989 | Mikkor | |
| 4,829,826 A | 5/1989 | Valentin et al. | |
| 4,846,440 A | 7/1989 | Carlson et al. | |
| 4,898,200 A | 2/1990 | Odajima et al. | |
| 4,911,616 A | 3/1990 | Laumann, Jr. | |
| 4,938,742 A | 7/1990 | Smits | |
| 4,939,405 A | 7/1990 | Okuyama et al. | |
| 5,065,978 A | 11/1991 | Albarda et al. | |
| 5,069,419 A | 12/1991 | Jerman | |
| 5,078,581 A | 1/1992 | Blum et al. | |
| 5,082,242 A | 1/1992 | Bonne et al. | |
| 5,085,562 A | 2/1992 | van Lintel | |
| 5,096,388 A | 3/1992 | Weinberg | |
| 5,129,794 A | 7/1992 | Beatty | |
| 5,148,074 A | 9/1992 | Fujita et al. | |
| 5,171,132 A | 12/1992 | Miyazaki et al. | |
| 5,176,358 A | 1/1993 | Bonne et al. | |
| 5,180,288 A | 1/1993 | Richter et al. | |
| 5,180,623 A | 1/1993 | Ohnstein | |
| 5,186,054 A | 2/1993 | Sekimura | |
| 5,192,197 A | 3/1993 | Culp | |
| 5,206,557 A | 4/1993 | Bobbio | |
| 5,219,278 A | 6/1993 | van Lintel | |
| 5,224,843 A | 7/1993 | van Lintel | |
| 5,244,527 A | 9/1993 | Aoyagi | |
| 5,244,537 A | 9/1993 | Ohnstein | |
| 5,316,261 A | 5/1994 | Stoner | |
| 5,322,258 A | 6/1994 | Bosch et al. | |
| 5,323,999 A | 6/1994 | Bonne et al. | |
| 5,325,880 A | 7/1994 | Johnson et al. | |
| 5,336,062 A | 8/1994 | Richter | |
| 5,368,571 A | 11/1994 | Horres, Jr. | |
| 5,441,597 A | 8/1995 | Bonne et al. | |
| 5,452,878 A | 9/1995 | Gravesen et al. | |
| 5,499,909 A | 3/1996 | Yamada et al. | |
| 5,526,172 A | 6/1996 | Kanack | |
| 5,529,465 A | 6/1996 | Zengerle et al. | |
| 5,536,963 A | 7/1996 | Polla | |
| 5,541,465 A | 7/1996 | Higuchi et al. | |
| 5,552,654 A | 9/1996 | Konno et al. | |
| 5,571,401 A | 11/1996 | Lewis et al. | |
| 5,593,134 A | 1/1997 | Steber et al. | |
| 5,642,015 A | 6/1997 | Whitehead et al. | |
| 5,683,159 A | 11/1997 | Johnson | |
| 5,696,662 A | 12/1997 | Bauhahn | |
| 5,725,363 A | 3/1998 | Bustgens et al. | |
| 5,759,014 A | 6/1998 | Van Lintel | |
| 5,759,015 A | 6/1998 | Van Lintel et al. | |
| 5,792,957 A | 8/1998 | Luder et al. | |
| 5,808,205 A | 9/1998 | Romo | |
| 5,822,170 A | 10/1998 | Cabuz | |
| 5,836,750 A | 11/1998 | Cabuz | |
| 5,839,467 A | 11/1998 | Saaski et al. | |
| 5,863,708 A | 1/1999 | Zanzucchi et al. | |
| 5,897,097 A | 4/1999 | Biegelsen et al. | |
| 5,901,939 A | 5/1999 | Cabuz et al. | |
| 5,911,872 A | 6/1999 | Lewis et al. | |
| 5,954,079 A | 9/1999 | Barth et al. | |
| 5,971,355 A | 10/1999 | Biegelsen et al. | |
| 6,089,534 A | 7/2000 | Biegelsen et al. | |
| 6,095,496 A | 8/2000 | Rydin et al. | |
| 6,106,245 A | 8/2000 | Cabuz | |
| 6,109,889 A | 8/2000 | Zengerle et al. | |
| 6,116,863 A | 9/2000 | Ahn et al. | |
| 6,120,002 A * | 9/2000 | Biegelsen et al. | 251/129.01 |
| 6,122,973 A | 9/2000 | Nomura et al. | |
| 6,123,316 A * | 9/2000 | Biegelsen et al. | 251/129.01 |
| 6,126,140 A | 10/2000 | Johnson et al. | |
| 6,151,967 A | 11/2000 | McIntosh et al. | |
| 6,167,761 B1 | 1/2001 | Hanzawa et al. | |
| 6,168,395 B1 * | 1/2001 | Quenzer et al. | 251/129.01 |
| 6,179,586 B1 | 1/2001 | Herb et al. | |
| 6,182,941 B1 | 2/2001 | Scheurenbrand et al. | |
| 6,184,607 B1 | 2/2001 | Cabuz et al. | |
| 6,184,608 B1 | 2/2001 | Cabuz et al. | |
| 6,211,580 B1 | 4/2001 | Cabuz et al. | |
| 6,215,221 B1 | 4/2001 | Cabuz et al. | |
| 6,240,944 B1 | 6/2001 | Ohnstein et al. | |
| 6,255,758 B1 | 7/2001 | Cabuz et al. | |
| 6,288,472 B1 | 9/2001 | Cabuz et al. | |
| 6,358,021 B1 | 3/2002 | Cabuz | |
| 6,373,682 B1 | 4/2002 | Goodwin-Johansson | |
| 6,382,228 B1 | 5/2002 | Cabuz et al. | |
| 6,418,793 B1 | 7/2002 | Pechoux et al. | |
| 6,431,212 B1 | 8/2002 | Hayenga et al. | |
| 6,432,721 B1 | 8/2002 | Zook et al. | |
| 6,445,053 B1 | 9/2002 | Cho | |
| 6,457,654 B1 | 10/2002 | Glezer et al. | |
| 6,464,200 B1 | 10/2002 | Hines et al. | |
| 6,496,348 B2 | 12/2002 | McIntosh | |
| 6,508,528 B2 | 1/2003 | Fuji et al. | |
| 6,520,753 B1 | 2/2003 | Grosjean et al. | |
| 6,549,275 B1 | 4/2003 | Cabuz et al. | |
| 6,561,224 B1 | 5/2003 | Cho | |
| 6,568,286 B1 | 5/2003 | Cabuz | |
| 6,590,267 B1 | 7/2003 | Goodwin-Johansson et al. | |
| 6,597,438 B1 | 7/2003 | Cabuz et al. | |
| 6,626,416 B2 | 9/2003 | Sharma et al. | |
| 6,640,642 B1 | 11/2003 | Onose et al. | |
| 6,644,117 B1 | 11/2003 | Kueck et al. | |
| 6,649,416 B1 | 11/2003 | Kauer et al. | |
| 6,651,506 B2 | 11/2003 | Lee et al. | |
| 6,655,923 B1 | 12/2003 | Lisec et al. | |
| 6,729,856 B2 | 5/2004 | Cabuz et al. | |
| 6,750,589 B2 | 6/2004 | Cabuz | |
| 6,758,107 B2 | 7/2004 | Cabuz | |
| 6,767,190 B2 | 7/2004 | Cabuz et al. | |
| 6,830,071 B2 | 12/2004 | Xu et al. | |
| 6,837,476 B2 | 1/2005 | Cabuz et al. | |
| 7,168,675 B2 | 1/2007 | Cabuz et al. | |
| 2001/0033796 A1 * | 10/2001 | Unger et al. | 417/53 |
| 2002/0078756 A1 | 6/2002 | Akiyama et al. | |
| 2002/0100888 A1 | 8/2002 | Sharma et al. | |
| 2002/0129857 A1 | 9/2002 | Xu et al. | |
| 2002/0174706 A1 | 11/2002 | Gokhfeld | |
| 2002/0182091 A1 * | 12/2002 | Potter | 417/413.3 |
| 2002/0192113 A1 | 12/2002 | Uffenheimer et al. | |
| 2003/0005774 A1 | 1/2003 | Suzuki et al. | |
| 2003/0019299 A1 | 1/2003 | Horie et al. | |
| 2003/0033884 A1 | 2/2003 | Beekhuizen et al. | |
| 2003/0142291 A1 | 7/2003 | Padmanabhan et al. | |
| 2003/0189809 A1 | 10/2003 | Ishikura | |
| 2003/0205090 A1 | 11/2003 | Jakobsen | |
| 2003/0234376 A1 | 12/2003 | Cabuz et al. | |
| 2004/0035211 A1 | 2/2004 | Pinto et al. | |
| 2004/0060360 A1 | 4/2004 | Chen | |

| | | |
|---|---|---|
| 2004/0144939 A1 | 7/2004 | Giousouf et al. |

FOREIGN PATENT DOCUMENTS

| | | |
|---|---|---|
| EP | 0774821 | 11/1996 |
| EP | 0779436 | 6/1997 |
| EP | 1215426 | 6/2002 |
| JP | 05-219760 | 8/1993 |
| JP | 02-86258 | 10/1995 |
| SU | 744877 | 6/1980 |
| WO | WO 97/29538 | 8/1997 |
| WO | WO 00/28215 | 5/2000 |
| WO | WO 01/33078 | 5/2001 |
| WO | WO 03/060331 | 7/2003 |

OTHER PUBLICATIONS

"Large-Scale Linearization Circuit for Electrostatic Motors" IBM Technical Disclosure Bulletin, U.S. IBM Corporation, vol.37, No. 10, pp. 563-564, Oct. 1, 1994.

B. Halg, "On a Nonvolatile Memory Cell Based on Micro-Electro-Mechanics", Proceedings of MEMS CH2832-4/90/0000-0172 IEEE (1990), pp. 172-176.

Bertz, Schubert, Werner, "Silicon Grooves With Sidewall Angles Down to 1° made By Dry Etching", pp. 331-339.

Branebjerg, Gravesen , " A New Electrostatic Actuator Proving Improved Stroke Length and Force." Micro Elctro Mechancial Systems '92 (Feb. 4-7, 1992), pp. 6-11.

Bustgens, Bacher, Menz, Schomburg, "Micropump Manufactured by Thermoplastic Molding" MEMS 1994, pp. 18-21.

C. Cabuz et al., "Factors Enhancing the Reliability of Touch-Mode Electrostatic Actuators," Sensors and Actuators 79(2000) pp. 245-250.

C. Cabuz et al., "Mesoscopic Sampler Based on 3D Array of Electrostatically Activated Diaphragms," Proceedings of the 10th Int. Conf. On Solid-State Sensors and Actuators, Transducers'99, Jun. 7-12, 1999, Sendai Japan.

C. Cabuz et al., "The Double Diaphragm Pump," The 14th IEEE International Micro Electro Mechanical Systems Conference, MEMS'01, Jan. 21-23, Interlachen, Switzerland.

C. Cabuz, et al., "High Reliability Touch-Mode Electrostatic Actuators", Techanical Digest of the Solid State Sensor and Actuator Workshop, Hilton Head, S.C., Jun. 8-11, 1998, pp. 296-299.

C. Cabuz. Tradeoffs in MEMS Material (Invited Paper) Proceedings of the SPIE, vol. 2881, pp. 160-170, Austin, TX., Jul. 1996.

Cabuz, Cleopatra, "Electrical Phenomena at the Interface of Rolling-Contact, Electrostatic Actuators", Nanotribology: Critical Assessment and Research Needs, Kluwer Academic Publisher, pp. 221-236, Copyright 2003, presented at the Nanotribology Workshop, Mar. 13-15, 2000.

Cleo Cabuz, "Dielectric Related Effects in Micromachined Electrostatic Actuators," Annual Report of the IEEE/CEIDP Society, 1999, Annual Meeting, Austin, Texas, Oct. 17-20, 1999.

Jye-Shane Yang et al., "Fluorescent Porous Polymer Films as TNT Chemosensors: Electronic and Structural Effects", *J. Am. Chem. Soc.*, 1998, 120, pp. 11864-11873.

Jye-Shane Yang et al., "Porous Shape Persistent Fluorescent Polymer Films: An Approach to TNT Sensory Materials", *J. Am. Chem. Soc.*, 1998, 120, pp. 5321-5322.

Michael S. Freund et al., "A Chemically Diverse Conducting Polymer-Based 'Electronic Nose'", Proceedings of the National Academy of Sciences of the United States of America, vol. 92, No.7, Mar. 28, 1995, pp. 2652-2656.

Minami K et al., "Fabrication of Distributed Electrostatic Micro Actuator (DEMA)" Journal of Microelectromechanical Systems, US, IEEE Inc., New York, vol. 2, No. 3, Sep. 1, 1993, pp. 121-127, XP000426532, ISSN: 1057-7157.

Porex Technologies, brochure, dated prior to Jun. 2, 2000, 4 pages.

Shikida, Sato, Characteristics of an Electrostatically-Driven Gas Valve Under High Pressure Conditions, IEEE 1994, pp. 235-240.

Shikida, Sato, Harada, "Fabrication of An S-Shaped Microactuator," Journal of Microelectromechanical Systems, vol. 6, No. 1 (Mar. 1997), pp. 18-24.

Shikida, Sato, Tanaka, Kawamura, Fujisaki, "Electrostatically Driven Gas Valve With High Conductance", Journal of Microelectromechanical Systems, vol. 3, No. 2 (Jun. 1994), pp. 76-80.

Srinivasan et al., "Self-Assembled Fluorocarbon Films for Enhanced Stiction Reduction", Transducers '97, 1997 International Conference on Solid-State Sensors and Actuators, Chicago, Jun. 16-19, 1997, pp. 1399-1402.

Wagner, Quenzer, Hoerscelmann, Lisec, Juerss, "Bistable Microvalve with Pneumatically Coupled Membranes," 0-7803-2985-6/96, IEEE (1996), pp. 384-388.

Bonne et al. "Actuation-Based Fuel Gas Microsensors", IGT Symposium on "National Gas Quality, Energy Measurement, Metering and Utilization Practices", Orlando, FL, 17 pages, Mar. 2001.

Ohnstein et al., "Micromachined Silicon Microvalve", Micro Electromechanical Systems Workshop, Salt Lake City, UT, 4 pages, Feb. 20-22, 1990.

\* cited by examiner

MICROFLUIDIC MODULATING VALVE

The present application is a continuation application of co-pending U.S. patent application Ser. No. 11/030,508, filed Jan. 6, 2005.

FIELD

The present invention generally relates to modulating valves, and more particularly, to microfluidic modulating valves that can selectively modulate the size of a flow channel.

BACKGROUND

Many modern industrial, commercial, aerospace, military and medical systems depend on reliable valves for fluid handling. The trends in fluid handling systems are toward smaller, more distributed and more portable systems for increasing uses in instrumentation and control. For example, microfluidic devices have become popular in such applications as analytical testing. In many cases, microfluidic devices are constructed in a multi-layer, often laminated, structure where each layer has channels and structures fabricated from a laminate material to form microscale voids or channels where fluids flow. The control and pumping of fluids through these channels is often affected by either external pressurized fluid forced into the laminate, or by structures located within the microfluidic device.

Many different types of valves for use in controlling fluids in such microscale devices have been developed. Many of these valves, however, are on-off type valves, and do not allow for the fluid flow to be modulated. What would be desirable, therefore, is a microfluidic modulating valve that can selectively modulate the size of a flow channel to allow for the fluid flow to be selectively modulated.

SUMMARY

The following summary of the invention is provided to facilitate an understanding of some of the innovative feature unique to the present invention and is not intended to be a full description. A full appreciation of the invention can be gained by taking the entire specification, claims, drawings, and abstract as a whole.

The present invention generally relates to modulating valves, and more particularly, to electrostatically actuated microfluidic modulating valves that can selectively change the size of a flow channel in order to modulate the fluid flow through the valve. In one illustrative embodiment, a valve is provided that includes a housing that defines a cavity, with an inlet and an outlet extending into the cavity. A diaphragm is positioned in the cavity, where at least part of the diaphragm defines at least part of the fluid path. One or more electrodes are fixed relative to the diaphragm, and one or more electrodes are fixed relative to the housing such that the diaphragm can be electrostatically actuated between at least three stable positions, wherein each stable position results in a different cross-sectional area of the fluid path. In some embodiments, the various stable positions provide a cross-sectional area such that fluid can flow between the inlet port and the outlet port in at least two of the stable positions.

In some illustrative embodiments, the valve includes at least two independently controllable diaphragm electrodes fixed relative to the diaphragm, and at least one housing electrode fixed relative to the housing. When a sufficient voltage is applied between a first one of the diaphragm electrodes and the one or more housing electrode, at least part of the diaphragm is actuated to provide a first cross-sectional area for the fluid path. When a sufficient voltage is applied between a second one of the diaphragm electrodes (or a different combination of diaphragm electrodes) and one or more housing electrode, at least part of the diaphragm is actuated to provide a second cross-sectional area of the fluid path, wherein the first cross-sectional area is different from the second cross-sectional area.

Alternatively, or in addition, the valve may include at least two independently controllable housing electrode fixed relative to the housing, and at least one diaphragm electrode fixed relative to the diaphragm. When a sufficient voltage is applied between a first one of the housing electrodes and one or more diaphragm electrode, at least part of the diaphragm is actuated to provide a first cross-sectional area of the fluid path. When a sufficient voltage is applied between a second one of the housing electrodes (or a different combination of housing electrodes) and one or more diaphragm electrode, at least part of the diaphragm is actuated to provide a second cross-sectional area of the fluid path. In some embodiments, at least two of the housing electrodes are fixed relative to the housing on the same side of the diaphragm.

In some embodiments, the valve may include at least two housing electrodes fixed relative to a first one of two opposing sides of the cavity that includes the diaphragm, and at least two housing electrodes fixed relative to a second one of the two opposing sides of the cavity. In addition, the diaphragm may include at least two diaphragm electrodes fixed relative to the diaphragm, wherein at least selected diaphragm electrodes are adjacent to and generally aligned with two corresponding housing electrode; one on the first side of the cavity and the other on the second side of the cavity. When a sufficient voltage is applied between one or more of the diaphragm electrodes and one or more of the corresponding housing electrodes, at least part of the diaphragm is pulled toward the housing electrode. When a sufficient voltage is applied between different ones of the diaphragm electrodes and the other corresponding housing electrode, at least part of the diaphragm is pulled toward the different housing electrode. This may allow the cross-sectional area of the fluid path to be actively controlled. When multiple diaphragm electrodes/housing electrodes are controlled in this manner, the shape of the diaphragm, and thus the cross-sectional area of the fluid path, may be modulated over a relatively wide range.

DETAILED DESCRIPTION OF THE DRAWINGS

Figure 1:
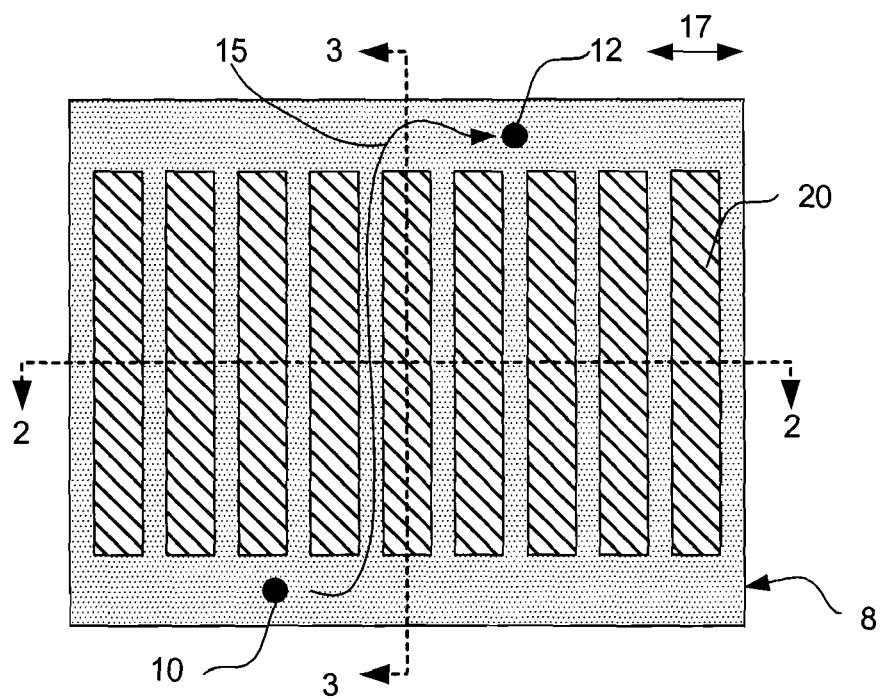
FIG. 1 is a schematic diagram of a top view of an illustrative normally open valve with equal area electrodes.

The following description should be read with reference to the drawings wherein like reference numerals indicate like elements throughout the several views. The detailed description and drawings show several embodiments which are meant to be illustrative of the claimed invention.

The present invention generally relates to modulating valves, and more particularly, to electrostatically actuated microfluidic modulating valves that can selectively change the size of a flow channel in order to help modulate the fluid flow through the valve. The term "fluid" as used herein includes liquids and/or gasses, as desired.

Figure 2:
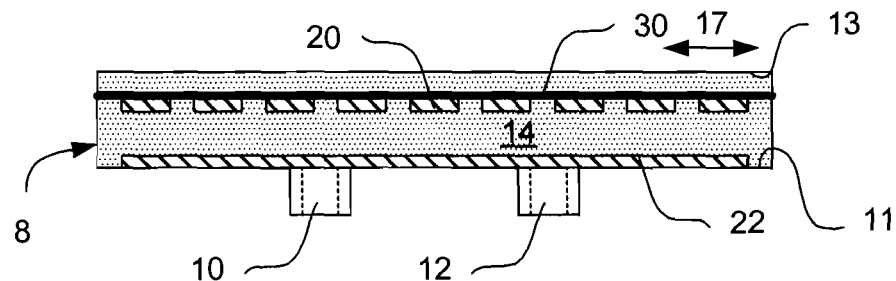
FIG. 2 is a schematic diagram of a front view of the illustrative embodiment of FIG. 1.
Figure 3:
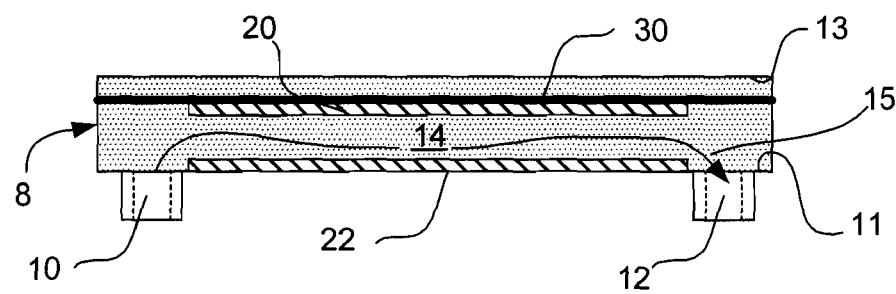
FIG. 3 is a schematic diagram of the side view of the illustrative embodiment of FIG. 1.

A first illustrative embodiment is shown in FIGS. 1, 2, and 3. FIG. 1 is a schematic diagram of a top view of an illustrative normally open valve in accordance with the present invention. FIG. 2 is a front view taken along 2-2 of FIG. 1, and FIG. 3 is a side view taken along 3-3 of FIG. 1.

The illustrative embodiment shown in FIGS. 1-3 includes a housing 8 that defines a cavity 14, with an inlet 10 and an outlet 12 extending into the cavity 14. A fluid path, such as fluid path 15, is selectively provided between the inlet 10 and outlet 12 through the cavity 14. A diaphragm 30 is positioned in the cavity 14, wherein at least part of the diaphragm 30 defines at least part of the fluid path 15. In the illustrative embodiment, the diaphragm 30 is positioned between two opposing sides 11 and 13 of the cavity 14. A number of diaphragm electrodes 20 are fixed relative to the diaphragm 30 as shown. The diaphragm electrodes 20 are spaced side-by-side in a spacing direction 17 along at least part of the diaphragm 30. In the illustrative embodiment, the flow path 15 extends normal (e.g. into the page in FIG. 2) or substantially normal to the spacing direction 17.

Specifically with reference to the illustrative embodiment of FIG. 2, a housing electrode 22 is fixed relative to opposing side 11 of housing 8. While only one housing electrode 22 is shown in FIG. 2, it is contemplated that more than one housing electrode 22 may be provided, if desired. When a voltage is applied between the housing electrode 22 and one or more selected diaphragm electrodes 20, the portion of the diaphragm that corresponds to the selected diaphragm electrodes 20 may be electrostatically pulled toward the housing electrode, thereby pinching off part of the flow path 15 through cavity 14. That is, by electrostatically pulling part of the diaphragm 30 toward the opposing side 11, the cross-sectional area of the flow path 15 may be reduced, which may modulate the fluid flow from the inlet 10 to the outlet 12 of the valve. In the illustrative embodiment, the diaphragm 30 may return to its un-activated position through elastic restoring forces.

In the illustrative embodiment, nine diaphragm electrodes 20 are shown. It is contemplated, however, that any suitable number of diaphragm electrodes 20 may be used, as desired. If none of the diaphragm electrodes 20 are electrostatically activated and pulled toward the opposing side 11, a maximum fluid flow cross-sectional area may be achieved between the inlet 10 and the outlet 12 of the valve. If one of the diaphragm electrodes 20 is electrostatically pulled toward the opposing side 11, a reduced fluid flow cross-sectional may be achieved between the inlet 10 and the outlet 12 of the valve. If two of the diaphragm electrodes 20 are electrostatically pulled toward the opposing side 11, an even further reduction in fluid flow cross-sectional area may be achieved between the inlet 10 and the outlet 12 of the valve, and so on. As can be seen, and depending on the number of diaphragm electrodes 20 that are provided and activated, a desired resolution in the modulated fluid flow through the valve may be achieved. In some illustrative embodiments, at least three stable diaphragm positions are provided, wherein fluid can flow from the inlet 10 to the outlet 12 in at least two of the stable positions.

The diaphragm electrodes 20 may be fixed to the diaphragm 30 and the housing electrode(s) 22 may be fixed to the housing 8 in any suitable manner. For example, the diaphragm electrodes 20 may be deposited on the diaphragm by evaporation or sputter deposition, doping the diaphragm 30 to be conductive in certain regions, screen printing a conductive material on the diaphragm, adhered an electrode pattern to the diaphragm 30, or in any other suitable manner. The one or more housing electrodes 22 may be provided in a different or similar manner, as desired. In some cases, part of all of the diaphragm or housing may be made from a conductive material, and may perform dual functions (e.g. as a housing and as an electrode), if desired.

In some cases, a dielectric layer may be provided over the diaphragm electrodes 20 and/or the housing electrode(s) 22. This may help prevent an electrical short between the diaphragm electrodes and the one or more housing electrodes when the diaphragm is pulled toward the housing electrodes during operation. The dielectric layer may also help protect the diaphragm electrodes and the one or more housing electrode(s) from the environment, and may further help prevent stiction.

Figure 4:
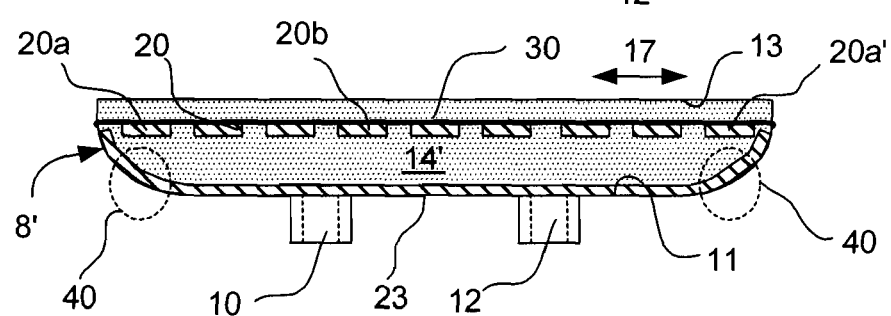
FIG. 4 is a schematic diagram of an alternative to the illustrative embodiment of FIG. 2 having the edges of the second electrode curve toward the diaphragm.

To help reduce the voltage that may be required to begin closing the valve, and with reference to FIG. 4, it is contemplated the opposing wall 11 may be curved toward the diaphragm at one or more regions, such as in regions 40. Since the electrostatic force that is generated at a given voltage is inversely proportional to the distance between the electrodes, such a construction may help reduce the voltage required to initially pull the diaphragm 30 toward the opposing wall 11, at least in the regions 40. During operation of the valve shown in FIG. 4, a controller may initially provide a voltage between diaphragm electrode 20a and housing electrode 23. This may pull the ends of the diaphragm down toward the opposing wall 11. This may also move the adjacent diaphragm electrodes closer to the housing electrode 23, which may also reduce the voltage that is required to pull the adjacent diaphragm electrodes toward the housing electrode 23, when desired. As can be seen, this may result in a "rolling" action of the diaphragm 30 as each successive diaphragm electrode is activated in sequence.

Figure 5:
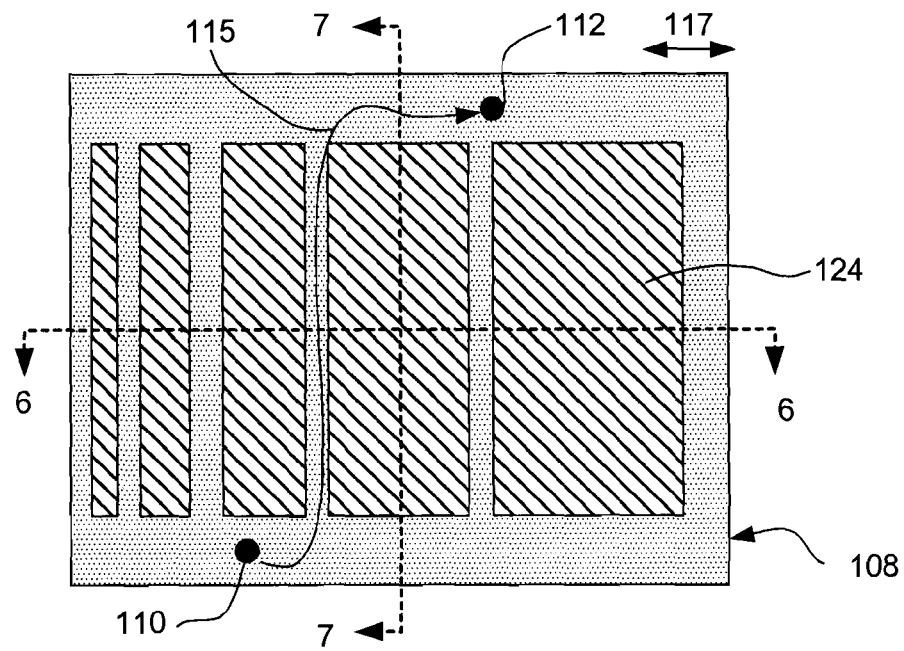
FIG. 5 is a schematic diagram of a top view of an illustrative normally open valve with binary patterned electrodes.
Figure 6:
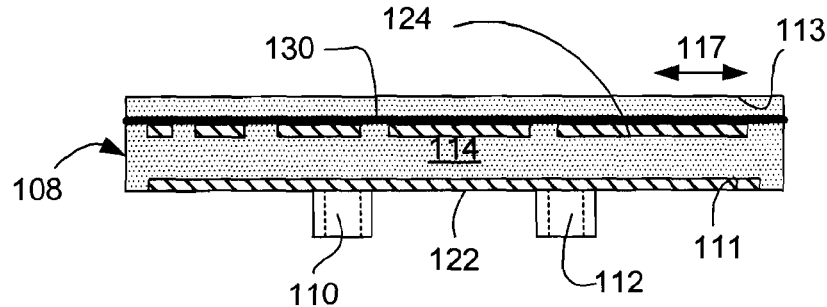
FIG. 6 is a schematic diagram of a front view of the illustrative embodiment of FIG. 5.
Figure 7:
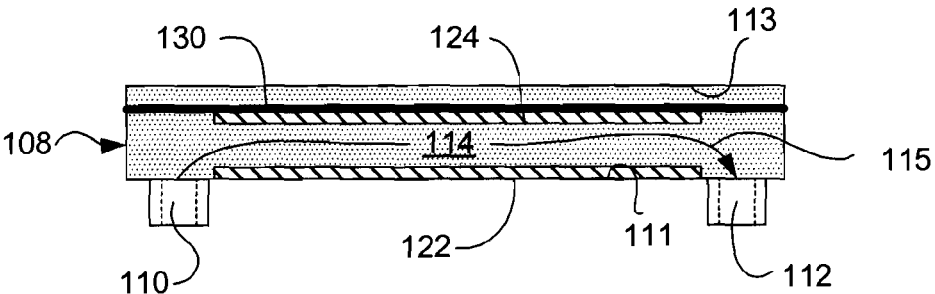
FIG. 7 is a schematic diagram of a side view of the illustrative embodiment of FIG. 5.

Another illustrative embodiment is shown in FIGS. 5, 6, and 7. FIG. 5 is a schematic diagram of a top view of an illustrative normally open valve with binary patterned electrodes. FIG. 6 is a front view taken along 6-6 of FIG. 5, and FIG. 7 is a side view taken along 7-7 of FIG. 5.

Similar to the previous illustrative embodiment, the illustrative embodiment shown in FIGS. 5-8 includes a housing 108 that defines a cavity 114, with an inlet 110 and an outlet 112 extending into the cavity 114. A fluid path, such as fluid path 115, is selectively provided between the inlet 110 and outlet 112 through the cavity 114. A diaphragm 130 is positioned in the cavity 114, wherein at least part of the diaphragm 130 defines at least part of the fluid path 115. In the illustrative embodiment, the diaphragm 130 is positioned between two opposing sides 111 and 113 of the cavity 114. A number of diaphragm electrodes 124 are fixed relative to the diaphragm 130 as shown. The diaphragm electrodes 124 are spaced side-by-side in a spacing direction 117 along at least part of the diaphragm 130. In the illustrative embodiment, the flow path 115 extends normal (e.g. into the page in FIG. 6) or substantially normal to the spacing direction 117.

The diaphragm electrodes 124 each have an electrode width along the spacing direction 117. In the illustrative embodiment, the diaphragm electrodes 124 have widths of $2^N$, where N represents the electrode position, from left to right, in the particular series of diaphragm electrodes. The advantage of having diaphragm electrodes 124 of different widths (e.g. $2^N$) is the increase in the resulting range of flow areas that can be achieved. As shown in the illustrative embodiment, there are five diaphragm electrodes 124. By activating different combinations of diaphragm electrodes, the five diaphragm electrodes may provide thirty-two combinations of different fluid flow areas. It is contemplated, however, that any suitable width of the diaphragm electrodes 124 may be used or any suitable number of diaphragm electrodes 124 may be used, as desired.

Similar as discussed above, one or more housing electrode(s) 122 may be fixed relative to opposing side 111 of the housing 108. When a voltage is applied between the housing electrode 122 and selected diaphragm electrodes 124, the portion of the diaphragm 130 that corresponds to the selected diaphragm electrodes 124 may be electrostatically pulled toward the housing electrode 122, thereby pinching off part of the flow path 115 through cavity 114.

Figure 8:
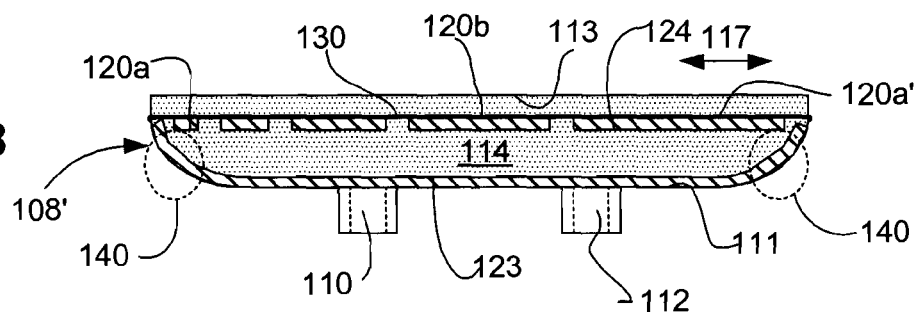
FIG. 8 is a schematic diagram of an alternative to the illustrative embodiment of FIG. 6 having the edges of the second electrode curve toward the diaphragm.

To help reduce the voltage that may be required to begin closing the valve, and with reference to FIG. 8, it is contemplated the opposing wall 11 may be curved toward the diaphragm 130 at one or more regions, such as in regions 140, as discussed above. Since the electrostatic force that is generated at a given voltage is inversely proportional to the distance between the electrodes, such a construction may help reduce the voltage required to initially pull the diaphragm 130 toward the opposing wall 111, at least in the regions 140.

Figure 9:
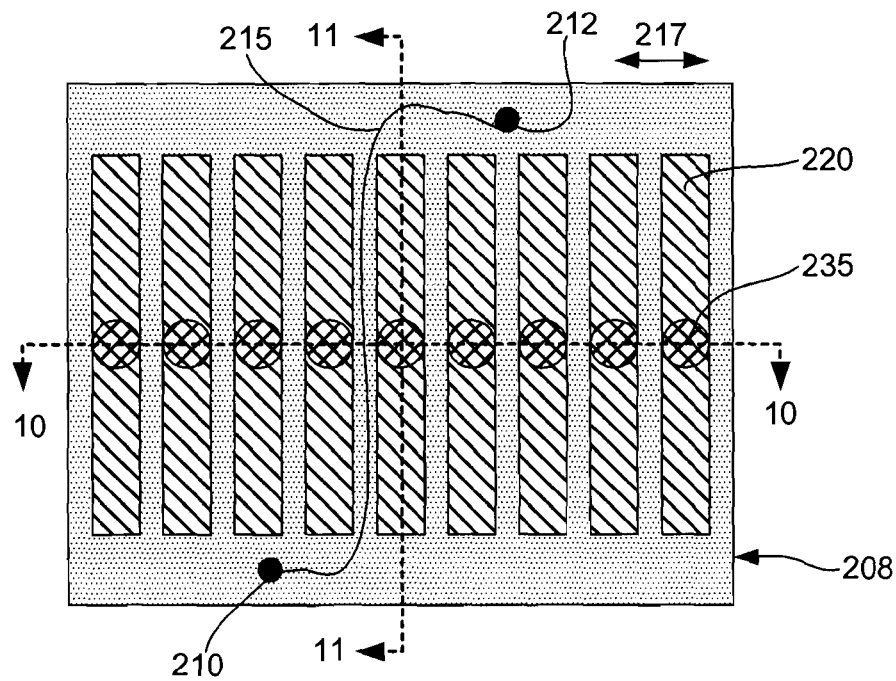
FIG. 9 is a schematic diagram of a top view of an illustrative normally closed valve with equal area electrodes.
Figure 10:
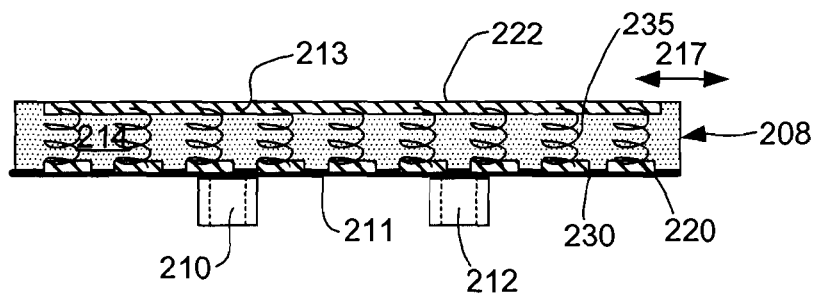
FIG. 10 is a schematic diagram of a front view of the illustrative embodiment of FIG. 9.
Figure 11:
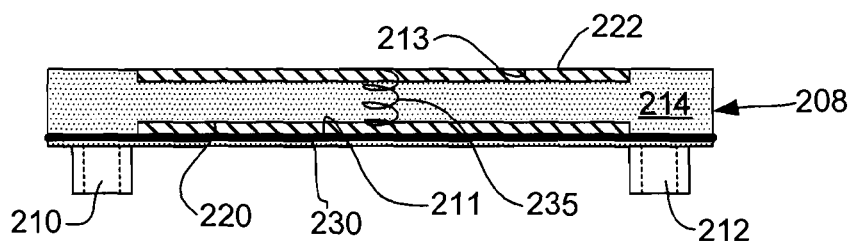
FIG. 11 is a schematic diagram of a side view of the illustrative embodiment of FIG. 9.

A third illustrative embodiment is shown in FIGS. 9, 10, and 11. FIG. 9 is a schematic diagram of a top view of an illustrative normally closed valve in accordance with the present invention. FIG. 10 is a front view taken along 10-10 of FIG. 9, and FIG. 11 is a side view taken along 11-11 of FIG. 9.

The illustrative embodiment shown in FIGS. 9-11 includes a housing 208 that defines a cavity 214, with an inlet 210 and an outlet 212 extending into the cavity 214. A fluid path, such as fluid path 215, is selectively provided between the inlet 210 and outlet 212 through the cavity 214. A diaphragm 230 is positioned in the cavity 214, wherein at least part of the diaphragm 230 defines at least part of the fluid path 215. In the illustrative embodiment, the diaphragm 230 is positioned between two opposing sides 211 and 213 of the cavity 214. A number of diaphragm electrodes 220 are fixed relative to the diaphragm 230 as shown. The diaphragm electrodes 220 are spaced side-by-side in a spacing direction 217 along at least part of the diaphragm 230. In the illustrative embodiment, the flow path 215 extends normal (e.g. into the page in FIG. 10) or substantially normal to the spacing direction 217.

Specifically with reference to FIG. 10, a housing electrode 222 may be fixed relative to opposing side 213 of housing 208. While only one housing electrode 222 is shown in FIG. 10, it is contemplated that more than one housing electrode 222 may be provided, if desired. In the illustrative embodiment, at least one biasing element 235 is provided between the number of diaphragm electrodes 220 and the housing electrode 222, as shown. In one case, each biasing element 235 may include a spring. However, the biasing element may be any suitable biasing means that is capable of biasing the diaphragm 230 toward opposing side 211 of cavity—in the normally closed valve configuration. In some cases, the biasing means may simply be the elastic properties of the diaphragm 230 itself. That is, the diaphragm 230 may be mounted (and possibly stretched) directly adjacent to the opposing side 211 of cavity. The diaphragm 230 may then return to this position by elastic restoring forces when the electrodes are not activated.

As illustrated in FIG. 10, there are nine diaphragm electrodes 220 each with a biasing element 235. It is contemplated, however, that there may be any number of diaphragm electrodes 220. It is also contemplated, that there may be any number of biasing elements 235 between the diaphragm electrode 220 and the housing electrode 222, as desired.

The biasing elements 235 exert a force between the number of diaphragm electrodes 220 and the housing electrode 222. The biasing force helps push the diaphragm 230 towards the housing wall 211 pinching off the flow path 215 through the cavity 214. When a voltage is applied between the housing electrode 222 and one or more of the diaphragm electrodes 220, a force is generated between the housing electrode 222 and the activated diaphragm electrodes 220, which overcomes the biasing force provided by the corresponding biasing elements 235. Thus, the portion of the diaphragm that corresponds to the selected diaphragm electrodes 220 may be electrostatically pulled toward the housing electrode 222, thereby opening part of the flow path 215 through cavity 214. That is, by electrostatically pulling part of the diaphragm 230 toward the opposing side 213, the cross-sectional area of the flow path 215 may be increased, which may modulate the fluid flow from the inlet 210 to the outlet 212 of the valve.

If none of the diaphragm electrodes 220 are electrostatically pulled toward the opposing side 213, a minimum fluid flow (in some cases no fluid flow) may be achieved between the inlet 210 and the outlet 212 of the valve. If one of the diaphragm electrodes 220 is electrostatically pulled toward the opposing side 213 overcoming the corresponding biasing element, an increased fluid flow may be achieved between the inlet 210 and the outlet 212 of the valve. If two of the diaphragm electrodes 220 are electrostatically pulled toward the opposing side 213, an even further increase in fluid flow may be achieved between the inlet 210 and the outlet 212 of the valve, and so on. As can be seen, and depending on the number of diaphragm electrodes 220 that are provided and activated, a desired resolution in the modulated fluid flow through the valve may be achieved. In some illustrative embodiments, at least three stable diaphragm positions are provided, wherein fluid can flow from the inlet 210 to the outlet 212 in at least two of the stable positions. One stable diaphragm 230 position may be fully closed, one may be fully open, and yet another may be partially open.

Figure 12:
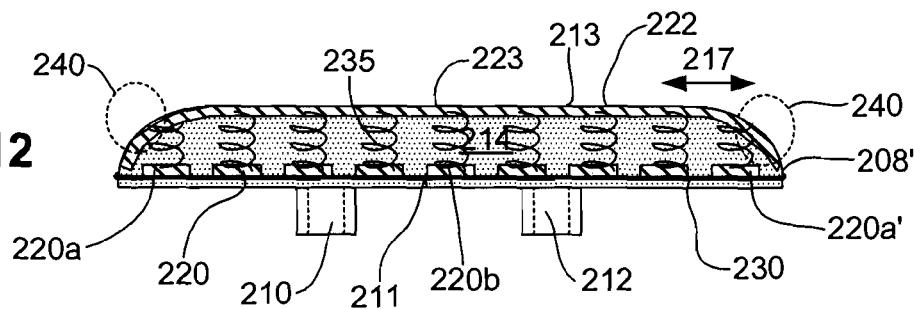
FIG. 12 is a schematic diagram of an alternative to the illustrative embodiment of FIG. 10 having the edges of the second electrode curve toward the diaphragm.

To help reduce the voltage that may be required to begin closing the valve, and with reference to FIG. 12, it is contemplated the opposing wall 213 may be curved toward the diaphragm 230 at one or more regions, such as regions 240. Since the electrostatic force that is generated at a given voltage is inversely proportional to the distance between the electrodes, such a construction may help reduce the voltage required to initially pull the diaphragm 230 toward the opposing wall 213, at least in the regions 240.

During operation of the valve shown in FIG. 12, a controller may initially provide a voltage between diaphragm electrodes 220a and housing electrode 223. This may pull the ends of the diaphragm 230 toward the opposing wall 213 overcoming the corresponding biasing elements 235. This may also move the adjacent diaphragm electrodes 220 closer to the housing electrode 223, which may reduce the voltage that is required to pull the adjacent diaphragm electrodes 220 toward the housing electrode 223, when desired. As can be seen, this may result in a "rolling" action of the diaphragm 230 as each successive diaphragm electrode 220 is activated in sequence.

Figure 13:
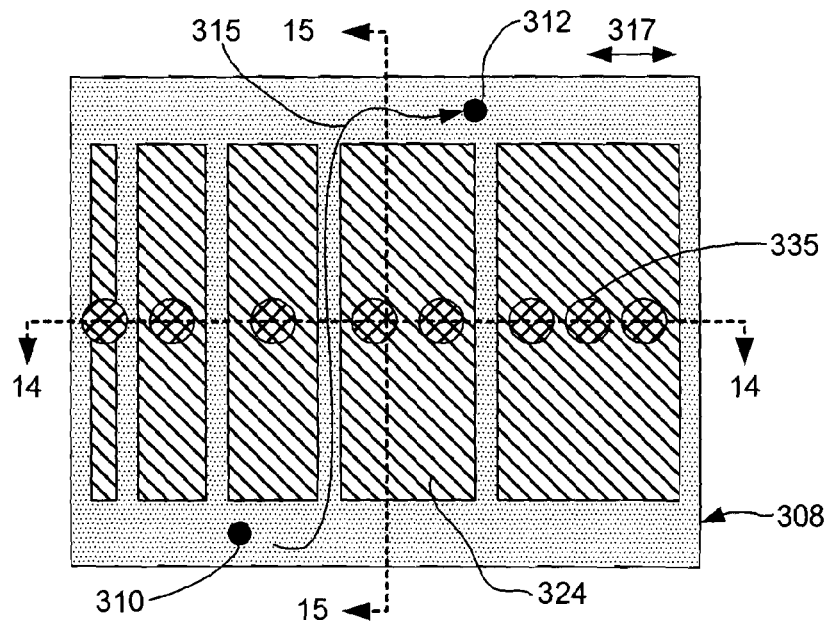
FIG. 13 is a schematic diagram of a top view of an illustrative normally closed valve with binary patterned electrodes.
Figure 14:
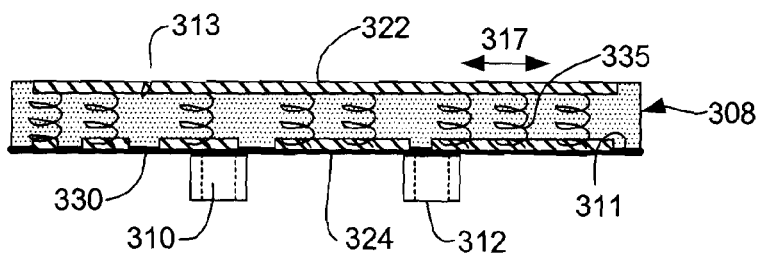
FIG. 14 is a schematic diagram of a front view of the illustrative embodiment of FIG. 13.
Figure 15:
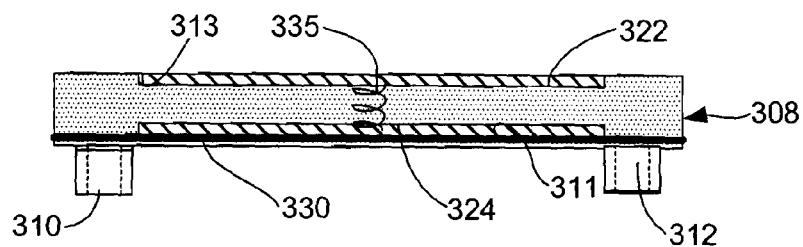
FIG. 15 is a schematic diagram of a side view of the illustrative embodiment of FIG. 13.

A fourth illustrative embodiment is shown in FIGS. 13, 14, and 15. FIG. 13 is a schematic diagram of a top view of an illustrative normally closed valve with binary patterned electrodes. FIG. 14 is a front view taken along 14-14 of FIG. 13, and FIG. 15 is a side view taken along 15-15 of FIG. 13.

Similar to the previous embodiment, the illustrative embodiment shown in FIGS. 13-15 includes a housing 308 that defines a cavity 314, with an inlet 310 and an outlet 312 extending into the cavity 314. A fluid path, such as flow path 315, is selectively provided between the inlet 310 and outlet 312 through the cavity 314. A diaphragm 330 is positioned in the cavity 314, wherein at least part of the diaphragm 330 defines at least part of the fluid path 315. In the illustrative embodiment, the diaphragm 330 is positioned between two opposing sides 311 and 313 of the cavity 314. A number of diaphragm electrodes 320 are fixed relative to the diaphragm 330 as shown. The diaphragm electrodes 320 are spaced side-by-side in a spacing direction 317 along at least part of the diaphragm 330. A biasing element 335 is fixed between diaphragm 330 and the housing 308, as shown. In the illustrative embodiment, the flow path 315 extends normal (e.g. into the page in FIG. 14) or substantially normal to the spacing direction 317.

The diaphragm electrodes 324 each have an electrode width along the spacing direction 317. In the illustrative embodiment, the diaphragm electrodes 324 have widths of $2^N$, where N represents the electrode position, from left to right, in the particular series of diaphragm electrodes. The advantage of having diaphragm electrodes 324 of different widths (e.g. $2^N$) is the increase in the resulting range of flow areas that can be achieved. As shown in the illustrative embodiment, there are five diaphragm electrodes 324. By activating different combinations of diaphragm electrodes 324, the five diaphragm electrodes may provide thirty-two combinations of different fluid flow areas. It is contemplated, however, that any suitable width of the diaphragm electrodes 324 may be used or any suitable number of diaphragm electrodes 324 may be used, as desired.

Specifically with reference to FIG. 14, a housing electrode 322 may be fixed relative to opposing side 313 of housing 308. While only one housing electrode 322 is shown in FIG. 14, it is contemplated that more than one housing electrode 322 may be provided, if desired. At least one biasing element 335 is positioned between the number of diaphragm electrodes 320 and the housing electrode 322. In one case, the biasing element 335 may include a spring, however, the biasing element may be any suitable biasing element as desired. As illustrated in FIG. 14, there are nine diaphragm electrodes 320 each with one or more biasing element. It is contemplated, however, that there may be any number of diaphragm electrodes 320. It is also contemplated, that there may be more than one biasing elements 335 for each diaphragm electrodes 320 as desired.

The biasing elements 335 exert a force between the corresponding diaphragm electrodes 320 and the housing 308. The biasing force pushes the diaphragm 330 towards the housing wall 311 pinching off the flow path 315 through the cavity 314. When a voltage is applied between the housing electrode 322 and one or more selected diaphragm electrodes 320, a force is generated between the housing electrode 322 and the selected diaphragm electrodes 320 to overcome the biasing force. The portion of the diaphragm that corresponds to the selected diaphragm electrodes 320 is electrostatically pulled toward the housing electrode 322, thereby opening part of the flow path 315 through cavity 314. That is, by electrostatically pulling part of the diaphragm 330 toward the opposing side 313, the cross-sectional area of the flow path 315 may be increased, which may modulate the fluid flow from the inlet 310 to the outlet 312 of the valve.

If none of the diaphragm electrodes 320 are electrostatically pulled toward the opposing side 313, a minimum fluid flow (in some cases no fluid flow) may be achieved between the inlet 310 and the outlet 312 of the valve. If one of the diaphragm electrodes 320 is electrostatically pulled toward the opposing side 313 overcoming the biasing means, an increased fluid flow may be achieved between the inlet 310 and the outlet 312 of the valve. If two of the diaphragm electrodes 320 are electrostatically pulled toward the opposing side 313, an even further increase in fluid flow may be achieved between the inlet 310 and the outlet 312 of the valve, and so on. As can be seen, and depending on the number and type of diaphragm electrodes 320 that are provided and activated, a desired resolution in the modulated fluid flow through the valve may be achieved. In some illustrative embodiments, at least three stable diaphragm positions are provided, wherein fluid can flow from the inlet 310 to the outlet 312 in at least two of the stable positions.

Figure 16:
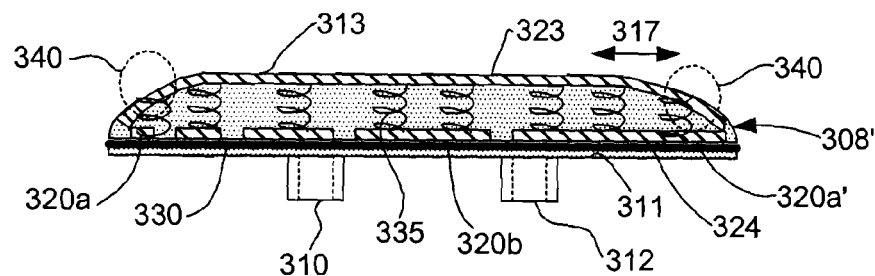
FIG. 16 is a schematic diagram of an alternative to the illustrative embodiment of FIG. 14 having the edges of the second electrode curve toward the diaphragm.

To help reduce the voltage that may be required to begin closing the valve, and with reference to FIG. 16, it is contemplated the opposing wall 313 may be curved toward the diaphragm 330 at one or more regions, such as regions 340. Since the electrostatic force that is generated at a given voltage is inversely proportional to the distance between the electrodes, such a construction may help reduce the voltage required to initially pull the diaphragm 330 toward the opposing wall 313, at least in the regions 340.

Figure 17:
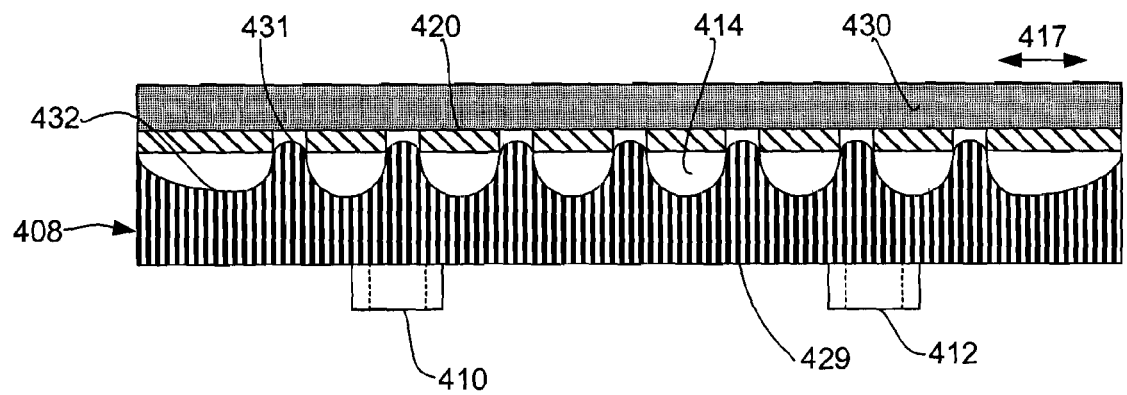
FIG. 17 is a schematic diagram of a front view of an illustrative valve including fluid flow valleys.

Another illustrative embodiment is shown in FIGS. 17. FIG. 17 is a schematic diagram of a cross-sectional view of a normally open valve including fluid flow valleys. The illustrative embodiment includes a housing 408, with an inlet 412 and outlet 412 extending into the cavity 414. A diaphragm 430 is positioned in the cavity 414, wherein at least part of the diaphragm 430 defines at least part of the fluid path. The housing wall 429 has a corrugated surface having alternating ridges 431 and groves 432. A number of diaphragm electrodes 420 are fixed relative to the diaphragm 430 as shown. The diaphragm electrodes 420 are spaced relative to the corrugated surface of the housing wall 429. It is contemplated that the width of the ridges 431 and groves 432 may be any width as desired and that the corresponding one or more diaphragm electrodes 420 may have a similar width. A housing electrode (not shown) may be fixed to the corrugated surface of the housing wall 429. The diaphragm electrodes 420 and the corrugated surface form fluid "flow valleys."

When a voltage is applied between the housing electrode (not shown) and one or more selected diaphragm electrodes 420, the portion of the diaphragm 430 that corresponds to the selected diaphragm electrodes 420 may be electrostatically pulled toward the housing electrode, thereby pinching off at least part of the flow valley through cavity 414 to modulate the flow. The advantage of having individual fluid flow valleys for each diaphragm electrode 420 is that as the diaphragm 430 is pulled toward housing wall 429, the corrugated surface may provide a better seal of the cavity 414. Thus, the leakage of the valve may be decreased. This embodiment may be incorporated with any of the previous embodiments to improve the performance of the valves.

Figure 18:
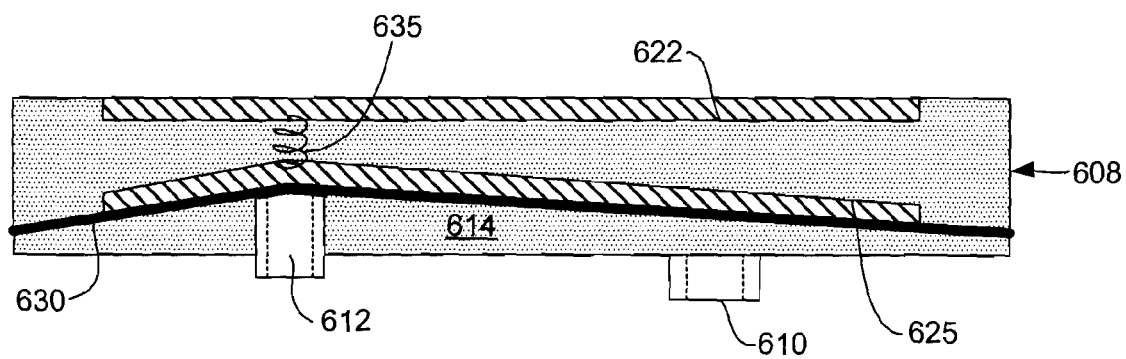
FIG. 18 is a schematic diagram of a side view of an illustrative valve seat.
Figure 19:
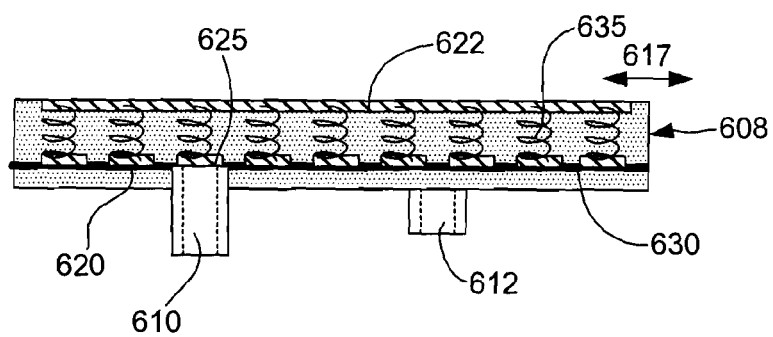
FIG. 19 is a schematic diagram of a front view of the illustrative embodiment in FIG. 18.

Another illustrative embodiment is shown in FIGS. 18 and 19. FIG. 18 is a schematic diagram of a side view of an illustrative valve seat. FIG. 19 is a front view of the embodiment in FIG. 18.

The illustrative embodiment shown in FIGS. 18 and 19 includes a housing 608 that defines a cavity 614, with an inlet 610 and outlet 612. A diaphragm 640 is position in the cavity 614, wherein at least part of the diaphragm 630 defines part of the fluid path. A number of diaphragm electrodes 620 are fixed relative to the diaphragm 630. The diaphragm electrodes are spaced side-by-side in a spacing direction 617 along at least part of the diaphragm 630. In the illustrative embodiment, a bias element is fixed between diaphragm 630 and the housing 408. The bias element 635 may be a spring or any other suitable bias means, as desired. In the illustrative embodiment, outlet 612 extends into the cavity. At least one diaphragm electrode 625, is a "valve seat" electrode. The one or more valve seat electrode 625 is situated over the outlet 612. The one or more valve seat electrode 625 is biased to push the diaphragm 630 over the outlet 612 to form a seal.

In operating the valve in the illustrative embodiment, the one or more valve seat electrode 625 may help control the opening and closing of the valve. The other diaphragm electrodes 620 may be used to modulate the flow of the fluid through the cavity 614 when the valve is open. When a voltage is applied to the one or more valve seat electrode 625, the diaphragm is pulled toward the housing electrode 422 opening the outlet 612 allowing fluid to flow. When a voltage is applied to the other diaphragm electrodes 620, the part of the diaphragm corresponding to the selected diaphragm electrodes 620 is pulled toward the housing electrode 422, thereby modulating the flow of fluid from the inlet 610 to the outlet 612. This embodiment may used in conjunction with any of the previous embodiments.

Figure 20:
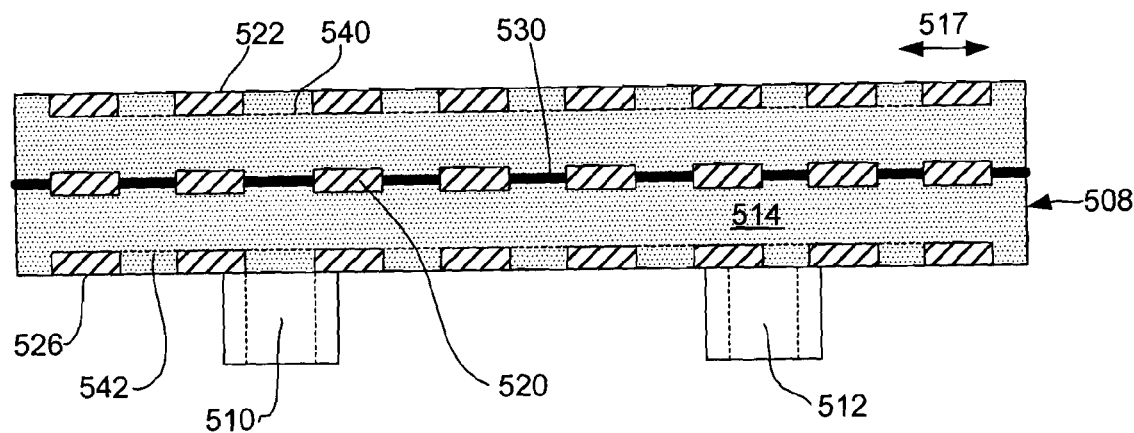
FIG. 20 is a schematic diagram of a front view of an illustrative normally open valve that can increase or decrease the size of the flow chamber.
Figure 21:
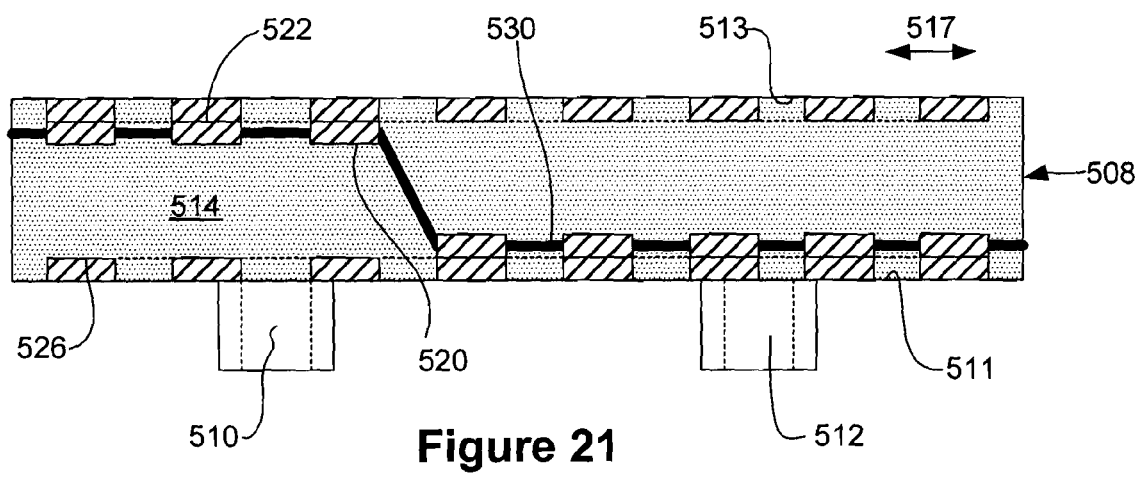
FIG. 21 is a schematic diagram of FIG. 20, with the diaphragm activated in a partially open position.

Another illustrative embodiment is shown in FIGS. 20 and 21. FIG. 20 is a schematic diagram of a side view of a normally open valve that can increase or decrease the size of the cavity 514. FIG. 21 is a schematic diagram of FIG. 20, with the diaphragm activated in a partially open position.

The illustrative embodiment includes a housing 508 that defines a cavity 514, with an inlet 510 and outlet 512 extending into the cavity 514. A diaphragm 530 is positioned in the cavity 514, wherein at least part of the diaphragm defines at least part of the fluid path. The diaphragm 530 is positioned between the two opposing sides of the cavity 511 and 513. A number of diaphragm electrodes 520 are fixed relative to the diaphragm 530 as shown. The diaphragm electrodes 520 are spaced along 517 of the diaphragm 530. The opposing cavity walls 511 and 513 each have housing electrodes 522 and 526 fixed to them. The housing electrodes 522 and 526 are shown similarly spaced along 517 as the diaphragm electrodes. It is contemplated that the diaphragm electrodes 520 and the housing electrodes 522 and 526 may be any width or spacing, as desired. Also, it is contemplated that the housing electrodes 522 and 526 may be continuous electrodes, as shown by dotted lines 540 and 542, rather than spaced electrodes. Alternatively, the housing electrodes 522 and 526 may be spaced electrodes, and the diaphragm electrodes 520 may be a continuous electrode, if desired.

To modulate the flow, a voltage may be applied to one or more selected diaphragm electrodes 520 and one or more housing electrodes 522 and 526. When a voltage is applied to one or more selected diaphragm electrodes 520 and one or more selected housing electrodes 522, the part of the diaphragm 530 corresponding to the diaphragm electrode 520 may be electrostatically pulled toward the housing electrode 522, thereby increasing the flow path of the cavity 514. When a voltage is applied to one or more selected diaphragm electrodes 520 and one or more selected housing electrodes 526, the part of the diaphragm 530 corresponding to the selected diaphragm electrode 520 may be electrostatically pulled toward the housing electrode 526, thereby decreasing the size of the flow path.

It is contemplated that one or more housing electrodes 522 and one or more housing electrodes 526 may be actuated at the same time pulling part of the diaphragm 530 up and pulling another part of the diaphragm 530 down, as shown in FIG. 21. However, a selected diaphragm electrode 520 may be actuated with either corresponding housing electrode 522 or 526. Thus, the flow can be modulated to increase or decrease the fluid flow in the cavity 514.

When the housing electrodes 522 and 526 are continuous electrodes, as shown by dotted lines 540 and 542, and in one illustrative embodiment, a positive voltage such as +A volts may be applied to the upper housing electrode 522, and a negative voltage such as −A volts may be applied to the lower housing electrode 526. Initially, the diaphragm electrodes 520 may be a zero volts. To modulate the flow, a positive voltage, such as +A volts, may be applied to one or more selected diaphragm electrodes 520 to move the corresponding diaphragm electrodes 520 toward the −A voltage of the lower housing electrode 526. Likewise, a negative voltage, such as −A volts, may be applied to one or more selected diaphragm electrodes 520 to move the corresponding diaphragm electrodes 520 toward the +A voltage of the upper housing electrode 522.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

What is claimed is:

1. A valve, comprising:
a housing that defines a cavity;
an inlet port in fluid communication with the cavity;
an outlet port spaced from the inlet port and in fluid communication with the cavity;
a diaphragm positioned in the cavity between the inlet port and the outlet port, wherein the diaphragm has an upstream edge positioned toward the inlet port and a downstream edge positioned toward the outlet port, wherein a fluid path extends from the inlet port, past the upstream edge of the diaphragm, past the downstream edge of the diaphragm, and to the outlet port, the fluid path having a cross-sectional area; and
at least three electrodes for use in electrostatically actuating at least part of the diaphragm between at least three stable positions, wherein each stable position results in a different cross-sectional area of the fluid path, and wherein the different cross-sectional areas are sized such that fluid can flow along the fluid path between the inlet port and the outlet port in at least two of the stable positions wherein at least two of the at least three electrodes are independently controllable.

2. The valve of claim 1 wherein at least two of the three or more electrodes are elongated and extend lengthwise along the fluid path, and are spaced side-by-side from one another in a direction that is perpendicular or substantially perpendicular to the fluid path.

3. The valve of claim 1 wherein at least two of the electrodes are fixed relative to the diaphragm, and at least one of the electrodes is fixed relative to the housing.

4. The valve of claim 1 wherein at least two of the electrodes are fixed relative to the housing, and at least one of the electrodes is fixed relative to the diaphragm.

5. The valve of claim 1 wherein the cavity is at least partially defined by two opposing sides of the housing.

6. The valve of claim 5 wherein at least one of the two opposing sides includes a portion that extends down closer to the diaphragm.

7. The valve of claim 6 wherein the portion that extends down closer to the diaphragm includes an electrode.

8. The valve of claim 7 wherein a part of the diaphragm adjacent to the portion of the at least one of the two opposing sides that extends down closer to the diaphragm includes an electrode.

9. The valve of claim 5 wherein at least part of at least one of the two opposing sides is corrugated having alternating ridges and grooves.

10. The valve of claim 9 wherein one or more of the electrodes are fixed relative to the corrugated side(s).

11. The valve of claim 10 wherein one or more of the electrodes are fixed relative to the diaphragm adjacent to corresponding grooves in the corrugated side(s).

12. The valve of claim 5 further comprising a biasing element for biasing the diaphragm away from one of the two opposing sides.

13. The valve of claim 12 wherein the biasing element bias the diaphragm in a position that closes or substantially closes the fluid path.

14. The valve of claim 1 wherein one of the at least three stable positions is a first partially open position, and another of the at least three stable positions is a second but different partially open position.

15. A valve, comprising:
a housing that defines a cavity;
an inlet port in fluid communication with the cavity;
an outlet port spaced from the inlet port and in fluid communication with the cavity;
a diaphragm positioned in the cavity between the inlet port and the outlet port, wherein the diaphragm has an upstream edge positioned toward the inlet port and a downstream edge positioned toward the outlet port, wherein a fluid path extends from the inlet port, past the upstream edge of the diaphragm, past the downstream edge of the diaphragm, and to the outlet port, the fluid path having a cross-sectional area;
at least three electrodes for use in electrostatically actuating at least part of the diaphragm between at least three stable positions, wherein each stable position results in a different cross-sectional area of the fluid path, and wherein the different cross-sectional areas are sized such that fluid can flow along the fluid path between the inlet port and the outlet port in at least two of the stable positions;
wherein at least two of the three or more electrodes are elongated and extend lengthwise along the fluid path, and are spaced side-by-side from one another in a direction that is perpendicular or substantially perpendicular to the fluid path; and
wherein at least two of the at least three electrodes are independently controllable.

16. The valve of claim 15 wherein at least two of the electrodes are fixed relative to the diaphragm, and at least one of the electrodes is fixed relative to the housing.

17. The valve of claim 15 wherein at least two of the electrodes are fixed relative to the housing, and at least one of the electrodes is fixed relative to the diaphragm.

18. A valve, comprising:
a housing that defines a cavity;
an inlet port in fluid communication with the cavity;
an outlet port in fluid communication with the cavity;
a fluid path within the cavity that extends between the inlet port and the outlet port, the fluid path having a cross-sectional area;
a diaphragm positioned in the cavity, at least part of the diaphragm defining at least part of the fluid path;
at least three electrodes for use in electrostatically actuating at least part of the diaphragm between at least three stable positions;
wherein in a first stable position, the diaphragm is in a generally planar first position;
wherein in a second stable position, a first part of the diaphragm remains in the generally planar first position, and a second part of the diaphragm is moved from the generally planar first position to another position;
wherein in a third stable position, a third part of the diaphragm is moved from the generally planar first position to another position;
wherein each stable position results in a different cross-sectional area of the fluid path, and wherein the different cross-sectional areas are sized such that fluid can flow between the inlet port and the outlet port in at least two of the stable positions wherein at least two of the at least three electrodes are independently controllable.

19. The valve of claim 18 wherein at least two of the electrodes are fixed relative to the diaphragm, and at least one of the electrodes is fixed relative to the housing.

20. The valve of claim 18 wherein at least two of the electrodes are fixed relative to the housing, and at least one of the electrodes is fixed relative to the diaphragm.

* * * * *